Jan. 23, 1940.   J. O. TOW   2,187,956
PIPE WRENCH
Filed May 5, 1936   2 Sheets-Sheet 1

INVENTOR.
James O. Tow
BY
ATTORNEY.

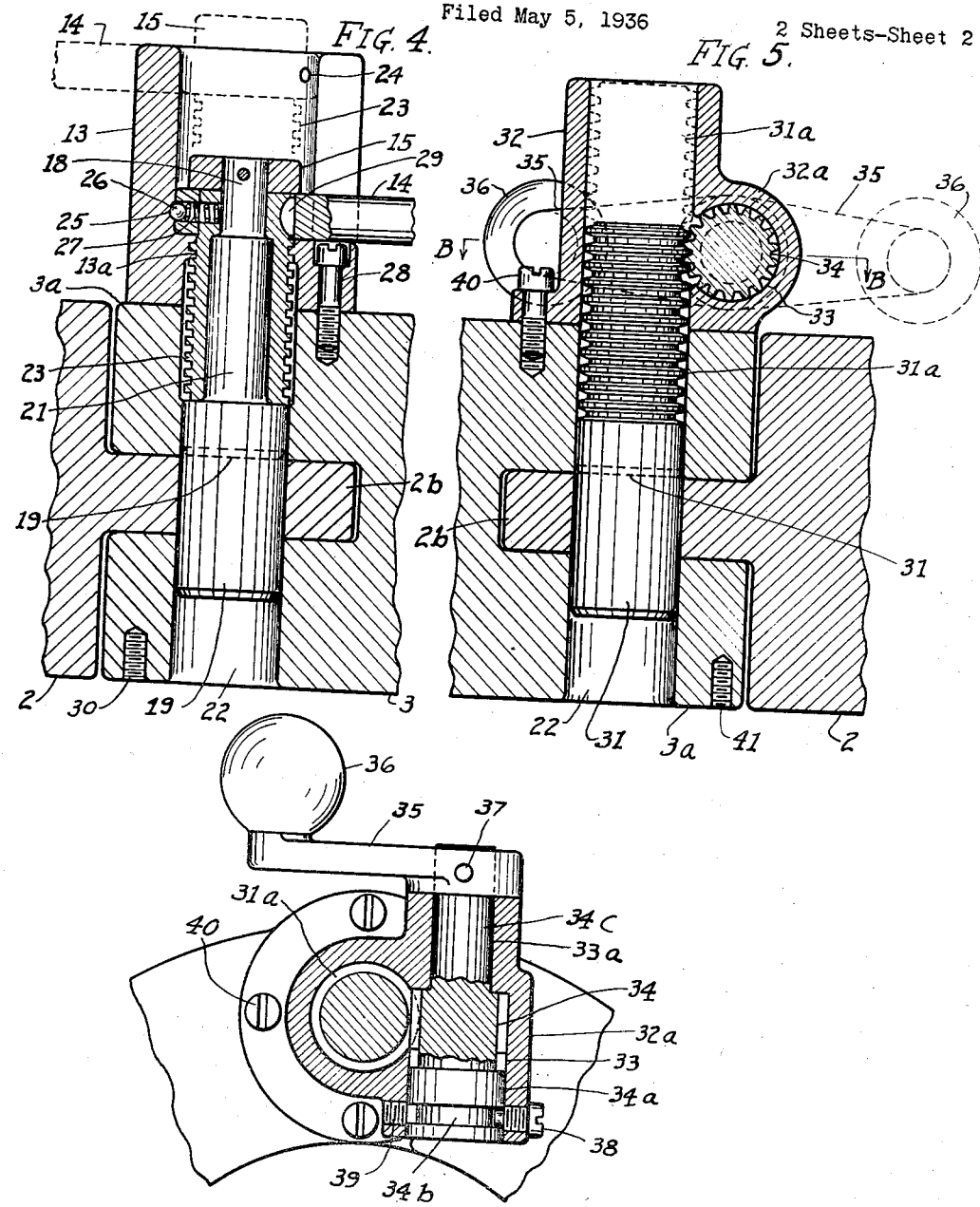

Patented Jan. 23, 1940

2,187,956

UNITED STATES PATENT OFFICE 2,187,956

PIPE WRENCH

James O. Tow, South Pasadena, Calif., assignor to Byron Jackson Co., Huntington Park, Calif., a corporation of Delaware Application May 5, 1936, Serial No. 77,996

1 Claim. (Cl. 81—66)

The invention relates to improvements in pipe wrenches in which a series of links are attached to a handle to form an endless chain to engage a pipe or other object and in which a means is provided for disconnecting and connecting the series of links on one side, to allow of the admission or removal of the pipe or other object; and the objects of the improvement are, to provide a pipe wrench with a safe latch for connecting and disconnecting the series of links, and to provide a speedy and convenient means for operation of said latch.

The invention is intended for use particularly with oil well pipe tongs. Such tongs are extremely large and heavy, being adapted for use with pipe up to 24 inches or more in diameter, and weighing as much as 400 pounds. In spite of their great size and weight, oil well pipe tongs must be capable of relatively quick operation, and must be operable by only one man. Furthermore, the tongs must withstand very great loads, and must be safe against accidental opening of the latching means.

It is the object of the present invention to provide a latch means for oil well pipe tongs, which cannot be unlatched accidentally, and which is strong, quick and easy in operation.

I attain these objects in the construction illustrated in the accompanying drawings in which—

Figure 4 is a sectional view taken on line A—A of Figure 1, and shows details of the latching mechanism.

Figure 5 shows an alternate form of a latching mechanism which may replace that shown in Figure 4 if desired.

Figure 6 is a sectional view taken on line B—B of Figure 5.

In practicing the invention I provide a series of links, the ends of the series being connected to the lever or handle of the wrench. I provide a disconnectible joint between two links of the series or "chain" of links. In doing this, I provide a movable pin and guiding means for its upper end, which includes means for pulling the pin at will to open the disconnectible joint.

Figure 1:
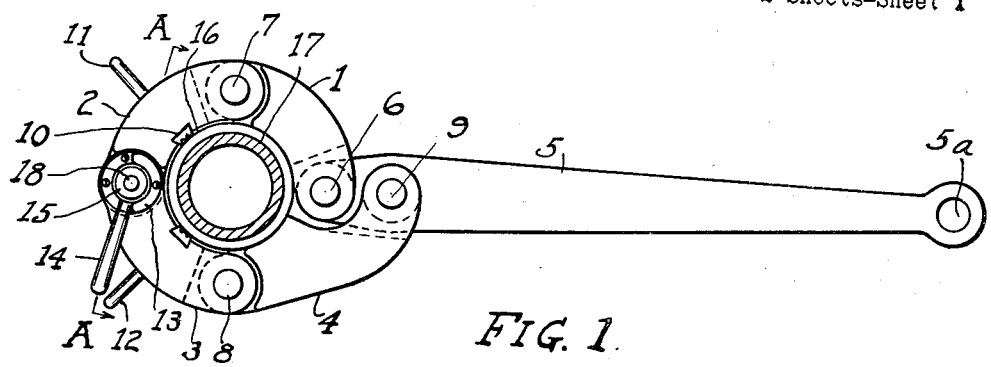
Figure 1 is a plan view of the wrench engaging a cylindrical object with its axis in a vertical position.
Figure 2:
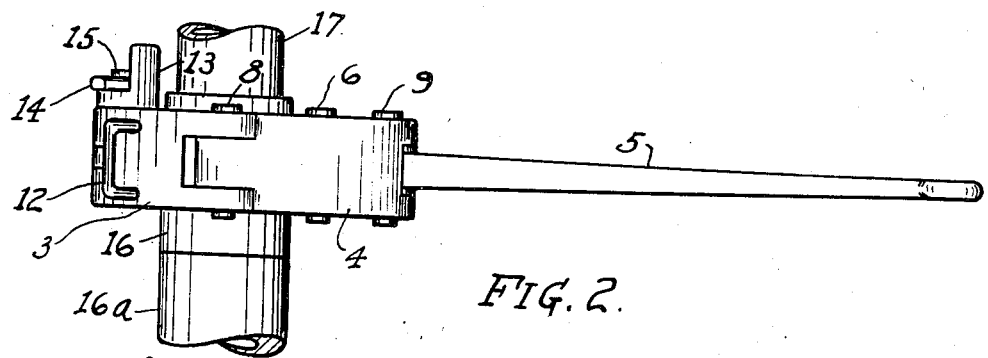
Figure 2 is an elevation of the wrench engaging the same cylindrical object.
Figure 3:
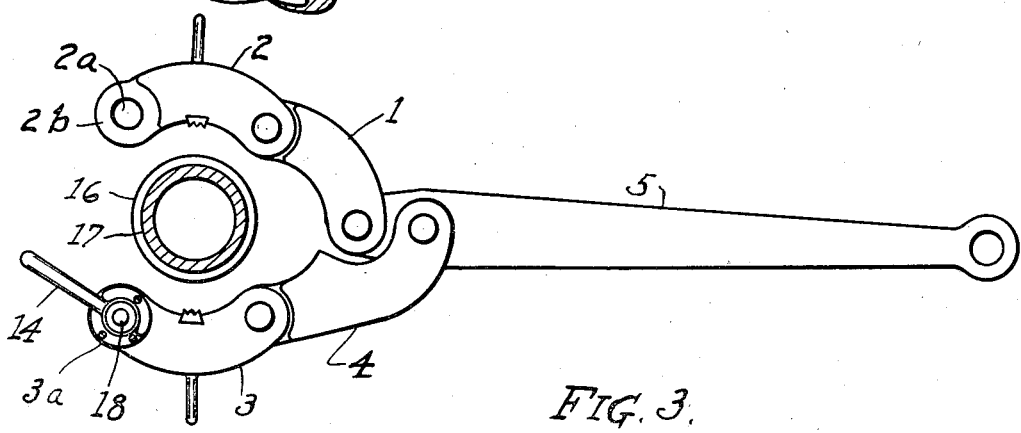
Figure 3 shows a plan view of the wrench in open position preparatory to the engagement or the removal of the cylindrical object.

The wrench proper is preferably constructed along the lines shown in Figures 1, 2, and 3, in which a link 1 is pivoted as shown on the end of a handle member 5, by means of a pin 6; a link 2 is pivoted on the link 1, as shown, by the pin 7; a link 4, is pivoted on the handle 5, by the pin 9; and a link 3, is pivoted on the link 4, by the pin 8.

The link 2 is formed on one end as shown at 2b, and with an eye 2a. The link 3 is formed with a forked end 3a to receive the tongue end 2b, of the link 2. An eye 22, in the forked end 3a of the link 3, aligns with the eye 2a in the tongue end of the link 2, when in latched position. A pin 19 is operable in the eye 22, and the eye 2a to latch the links 2 and 3 together, and the pin 19 is shown in latched position in Figure 4, and the position of the lower end in unlatched position is shown by dotted line 19, in the same figure. A portion of the pin 19 is of reduced diameter and is shown at 21, Figure 4. Rotatably mounted on this reduced portion 21 is the threaded sleeve 23, with multiple thread operating in nut thread 13a, which nut thread 13a is formed in the latch body 13. A third portion of the pin 19 is reduced to a smaller diameter than that shown at 21, and is shown at 18; this portion 18, of the pin, fits rotatably in the upper portion of the sleeve 23. A lever 14 is fixedly mounted on the sleeve 23, by means of a key 29, and the hub of this lever carries a ball 26, forced outwardly by the spring 27, in the depressions 25 and 24 in latched and unlatched positions respectively. A collar 15 is secured on the upper end of the pin portion 18, to retain the sleeve 23 and the lever 14 in place.

The unlatched positions of the lever 14, sleeve 23, and collar 15 are shown in dotted lines. The latch body 13 may be secured to the link end 3a, by screws as at 28, and may be mounted on the opposite side of the link end 3a by using the tapped holes, one of which is shown at 30.

The latch body 13 may also be attached to the link end 3a, by forming a tubular portion of reduced diameter thereon, the said tubular portion to fit closely in a counterbore that may be made in the link end. A set screw or dowel may be used to secure the latch body in place in such case.

The operation of the latch shown in Figures 1 to 4 is as follows: Assuming that the wrench is in the open position shown in Fig. 3 and is about to be applied to a pipe 17, the pin 19 and lever 14 will be in the retracted position indicated by the dotted lines in Fig. 4. The wrench is then closed around the pipe and the lever 14 is rotated about its axis, thus lowering the pin 19 (by virtue of the threaded nut and sleeve 13a and 23) into the eye 2a of the opposite link 2, and thereby locking the links 2 and 3 together. The pin 19 tends to stay in the latched position because of the spring catch 26, and also because of the force of gravity acting on the pin. The pipes upon which these wrenches are used are customarily in a vertical position, and hence the connecting pin tends by gravity to stay in position.

To release the tong from the pipe the lever 14 is turned to the position shown in the dotted lines in Fig. 4.

In the form of latch shown in Figures 5 and 6, the pin 31 latches the links 2 and 3 together in a manner similar to the latching by pin 19, previously described. In this case the pin 31 has annular rack teeth 31a, formed on its upper portion. The upper portion of the pin extends into the latch body 32, and is engaged by a pinion 34, loosely fitting the counterbore 33, in the boss 32a. The pinion 34 is formed with a shaft 34c, loosely fitting the bore 33a. The outer end of this shaft carries a crank 35, fixed thereto by the pin 37, and the crank terminates in a handle 36. Also formed integral with the pinion is a cylindrical head 34a, with a groove 34b extending part way around it. A screw 38 extends into the groove and limits the rotation of the pinion 34 so that the handle 36 may be moved to the position indicated by the dotted lines in Figure 5; this movement should preferably be through 180° of arc. By changing the screw 38 to the tapped hole 39, the same degree of movement is had but through the opposite arc.

The latch body may be attached to the link end 3a by screws as at 40, and may be mounted on the opposite side of the link end by using the tapped holes, one of which is shown at 41. The latch body may be mounted by other means such as have been explained in connection with Figure 4, if desired. The handle 36 acts as a counterweight to hold the pin 31 in unlatched position until it is desired to move it to latched position. In case the latch body is mounted on the under side of the link end 3a, the handle will act as a counterweight to hold the pin in latched position.

The pin 31 of the latch shown in Fig. 5, like the pin 19 of Fig. 4, tends to stay in the locked position by gravity acting on the crank 35. When the pin 31 is in the retracted position, as shown in dotted lines, the force of gravity acting on the crank 35 is sufficient to hold the pin 31 in the retracted position.

It will be apparent that the pin 19, in Figure 4, and the pin 31, in Figure 5, may rotate without disturbing or injuring the pin operating mechanism. It would be possible to operate the pin 31, with rack teeth formed on one side only, but in case the pin were forced to rotate slightly under heavy load damage to the rack and pinion teeth might occur.

It will be apparent that either of the latch bodies 13 and 32 may be formed integral with the link end 3a.

It will be understood in viewing Figure 1, that the wrench grips the object 16, when the handle 5 is rotated in counterclockwise direction and loosens its grip when oppositely rotated.

A similar wrench of opposite hand may be used to hold or turn the pipe 17, or the member 16a.

The members 16 and 16a here represent the pin and box of a rotary oil well tool joint.

An eye 5a may be provided at the outer end of the handle 5 for a rope if desired.

It will be evident that considerable changes as to details may be made without departing from the spirit of my invention. For instance, two or more links may be used.

Having thus described my invention, I claim:

A pipe wrench having a lever and a series of pipe-encircling links connected to the same, said parts constructed to swing in a substantially horizontal plane, and having a disconnectible joint including a latching pin, with lever means connected with the pin for raising said pin to disconnect said joint, said lever means mounted to swing in a substantially vertical plane past a vertical position so that the action of gravity on said lever means will hold the latching pin in its latched or its unlatched position.

JAMES O. TOW.